3,231,585
ARYLTHIO THIOPHENES
Walter Reifschneider, 2500 Damman Drive,
Midland, Mich.
No Drawing. Filed June 27, 1962, Ser. No. 205,507
2 Claims. (Cl. 260—329)

The present invention is directed to thioethers and in particular is directed to novel thioethers corresponding to the formula

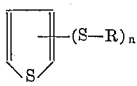

In the present specification and claims, R represents an aromatic hydrocarbon group being of a total of from 6 to 12, inclusive, carbon atoms, upon which any substituents are acyclic lower alkyl radicals and $n$ is an integer from 2 to 4, inclusive. The aromatic nuclei to be employed are thus phenyl (including phenyl substituted in the indicated manner) and naphthyl. Substituents to be employed upon the said aromatic nuclei include methyl, ethyl, n-propyl and isopropyl and the butyl, pentyl and hexyl hydrocarbon groups. Upon the naphthyl groups of the (naphthylthio)thiophenes there may be alkyl substituents containing up to 2 carbon atoms.

The novel compounds are liquids or crystalline solids appearing white to yellow to brown in mass, very slightly soluble in water but readily soluble in various common organic solvents such as benzene, carbon disulfide, and the like. The compounds are useful as insecticides and herbicides; they are good algaecides of low animal toxicity; as inhibitors of the germination of fungus spores, they are effective fungistats. The compounds are also useful as additives to improve the properties of organic solvent systems and of lubricating oils especially designed for operation under high pressures and temperatures; they are useful as intermediates in the preparation of dyestuffs and biologically active materials. They are of value as alcohol denaturants.

The compounds are prepared by a process which comprises the steps of causing a reaction between a halothiophene compound corresponding to the formula

wherein X represents halogen, and a mercaptan compound corresponding to the formula

G—S—R wherein G is hydrogen, alkali metal, or cuprous copper. During the reaction to prepare the present compounds, $n$ molecules of mercaptan react with each molecule of halothiophene. Small amounts of mercaptan may be lost in side reactions. Thus, when it is desired to prepare the present compound in a high state of purity and with a minimum of post-synthesis purification procedure, the starting reactants should be employed in stoichiometric proportions, or preferably, with the mercaptan in slight excess, and unconsumed starting material of whatever identity may, if desired, be recycled into further synthesis process.

The reaction goes forward at temperatures over a wide range such as from 20° to 350° C., but initiates most readily when heated to a temperature somewhat higher than room temperature, preferably from 100° to 250° C. Under these conditions the reaction is, in general, exothermic and goes forward to completion with good yield calculated upon the basis of consumed starting material. When mercaptan is employed, hydrogen halide of reaction is evolved and means for its orderly disposal are advantageously provided.

Typically, in the preparation of the compounds of the present invention, reaction between the mercaptan starting material and the halothiophene starting material will initiate and go forward only when there is employed, a catalytic amount of both a source of cuprous ion and a nitrogenous base. Thus, in the preparation of many, and probably all of the present compounds, the employment of such catalyst is essential and critical, although the exact weight is not critical. Certainly, the employment of such catalyst is in all cases highly advantageous. The source of cuprous ion may be metallic copper, in which case the copper reacts in some way to obtain cuprous halide. Also, cuprous oxide may be employed as a source of cuprous ion in which case water of reaction is evolved and cuprous halide results. Cuprous chloride itself or other cuprous salt may be employed. The employed weight is not critical, but may vary from a very small trace amount, less than $\frac{1}{100}$ of 1 molar percent, to as much as an amount equimolecular with either reactant or even greater. In general, the employment of larger amounts is accompanied by no major advantage and, being expensive, is not preferred.

The nitrogenous base may be ammonia, a primary, secondary, or tertiary aliphatic or aromatic amine or a nitrogenous heterocyclic wherein the nitrogen acts, or is capable of acting, as a basic substance. If desired, the nitrogenous base may be a naturally liquid substance which is employed as a reaction medium. Otherwise, such base is dissolved in inert liquid reaction medium such as an aliphatic or aromatic hydrocarbon.

In laboratory procedures it is preferred to employ the nitrogeneous base catalyst substance in sufficient excess that portions of it may act as hydrogen halide acceptor, portions may act as liquid reaction medium, and yet further portions may continue to function, unreacted, in the necessary catalytic manner.

In carrying out the reaction to prepare the compounds of the present invention, the halothiophene and the mercaptan compound are intimately mixed and blended, in any order and in desired amounts, with source of cuprous ion and nitrogenous base as hereinbefore described and thereafter heated, to a temperature at which reaction takes place promptly. In one convenient method of practicing the present method, the reaction temperature may be the reflux temperature of the liquid reaction mixture. In this situation, heating may be continued at the boiling temperature of the reaction mixture and under reflux for a period of time to carry the reaction to completion.

Upon completion of the reaction, the desired compounds of the present invention are separated in manners which, in view of the teaching of the instant specification, will be evident to skilled chemists. In one such manner, the reaction mixture, hot from heating to the reaction temperature, is poured into a mixture of ice and concentrated hydrochloric acid whereupon a precipitate usually forms from which the desired product can be extracted as a solvent-soluble fraction. Representative extraction solvents include diethyl ether, chlorinated hydrocarbons, and benzene. In any event, the product of reaction is extracted with solvent, the solvent extract dried over an inert drying agent such as, for example, anhydrous potassium carbonate or the like; the solvent vaporized and removed and the remaining product chilled or otherwise induced to crystallize and, if desired, recrystalized from a solvent such as a lower alkanol.

When production of the present compounds is to be carried out on an industrial scale, various other methods of separation and purification may be preferred, including, for example, centrifugation, decantation, vacuum distillation, and the like.

The following examples, without more, will enable those skilled in the art to practice the present invention.

*Example I.—2,5-bis(phenylthio)thiophene*

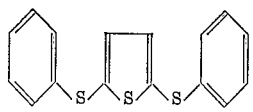

A reaction mixture is prepared, consisting of 15.3 grams (0.1 mole) of 2,5-dichlorothiophene, 16 grams of cuprous oxide (technical grade) and 22 grams (0.2 mole) of benzenethiol (phenyl mercaptan) dispersed in a mixture consisting of 110 milliliters quinoline and 10 milliliters pyridine. The resulting reaction mixture is placed in a flask under reflux, the reflux being equipped with a water trap. In this situation, the reaction mixture is heated at its reflux temperature (a pot temperature between approximately 200 and 240° C.) for 6 hours with stirring to carry the reaction to completion. At the end of this reaction period, the resulting hot mixture is poured into a mixture of shaved ice and excess concentrated hydrochloric acid. As a result of these procedures, the ice melts and basic substances react with hydrochloric acid; in the resulting acidified water a precipitate forms. The precipitate is collected by filtration and extracted with ether, the ether extract liquid being saved. This liquid is dried over a bed of anhydrous potassium carbonate which also neutralizes remaining traces of acidic substances; the resulting liquid is warmed to vaporize and remove ether solvent and obtain a residual oil. This oil crystallizes upon standing; the crystals are taken up in hot ethanol and precipitated therefrom as the ethanol cools, to obtain a 2,5-bis(phenylthio)thiophene product as pale tan crystalline plates having a melting point of 45°–46° C.

The compound of the present example is useful as an insecticide for the control of domestic insects. The application of a water dispersion containing 0.5 gram of the said compound as sole toxicant per 100 milliliters of resulting aqueous dispersion to a population of American cockroach resulted in the kill of a high proportion of the insects. Also, the use of a thorough wetting spray containing, as sole protective agent, the compound of the present example in the amount of ¼ of 1 percent by weight of resulting aqueous solution proved quite effective in the protection of young wheat plants from subsequent infestation with a live culture of spores of wheat stem rust.

*Example II.—2,5-bis(1-naphthylthio)thiophene*

In procedures essentially similar to the foregoing except that the starting mercaptan employed in an amount approximately twice equimolecular with the 2,5-dichlorothiophene is 1-naphthalenethiol (a yellow oil boiling at 128° C. under pressure of 12 millimeters mercury absolute) there is prepared, in good yield, 2,5-bis(1-naphthylthio)thiophene as tan crystalline plates readily soluble in 95 percent ethanol and in benzene, and low solubility in water. The compound is quite effective when employed as sole protective agent for the prevention of subsequent infection of tomatoes with a live inoculum of *Alternaria solani*.

The closely related compound, 2,5-bis(2-naphthylthio)thiophene prepared similarly but using solid 2-naphthalenethiol as starting material, is similarly of value as a selective pesticide.

*Example III.—2,5-diphenylthio-3,4-di-p-tolylthio thiophene*

The present synthesis takes advantage of the greater reactivity of a bromine substituent upon thiophene, than a chlorine substituent. In a mixture of 130 milliliters technical 2,4-lutidine and 60 milliliters quinoline, as mixed liquid reaction medium, is dispersed 46 grams (0.2 mole), 2,5-dibromo-3,4-dichlorothiophene and 34.7 grams (0.2 mole) of the cuprous salt of benzenethiol. The resulting reaction mixture is heated, with stirring, at its boiling temperature and under reflux for 2 hours. Thereafter, there is added 37.5 grams (0.2 mole) of the cuprous salt of p-toluenethiol as heating and stirring are continued. At the conclusion of the reaction time, the resulting hot mixture is poured directly into a mixture of chipped ice and 200 milliliters concentrated hydrochloric acid. As a result of these procedures, the ice melts and a solid separates in the resulting aqueous dispersion. This solid is collected by filtration and a chloroform extract made of it. The chloroform extract is washed twice with hydrochloric acid and then dried over anhydrous potassium carbonate. From the resulting dry chloroform solution, chloroform solvent is evaporated, leaving a white product solid which is recrystallized from methanol to obtain pale tan crystals of 2,5-diphenylthio-3,4-di-p-tolylthio thiophene having the structural formula

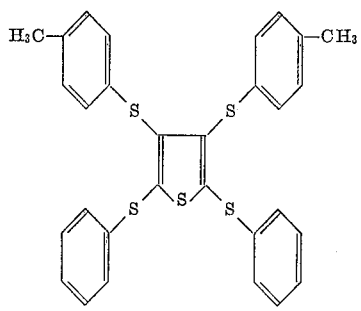

By employing the different reactivities of the different halogen substituents upon thiophene, and by using therewith predetermined molar amounts of reactants, it is possible to direct a predetermined thioaryl substituent to any predetermined ring carbon atom of the thiophene nucleus. For this purpose, the reactivity of the halogens follows the order of their molecular weight.

In procedures essentially the same as the foregoing, by the use of appropriate starting materials, other products of the present invention are prepared as follows:

From 2,3-diiodothiophene and 2 molecular proportions of the cuprous salt of p-tert.-butylbenzenethiol in liquid lutidine-quinoline mixture, 2,3-di(p-tert.-butylphenylthio)-thiophene.

From 2,3,4,5-tetrafluorothiophene and 4 molecular proportions of cuprous 3,4-dimethylbenezenethiolate in a propanol solution of secondary n-butylamine, 2,3,4,5-tetrakis(3,4-dimethylphenylthio)thiophene.

From 2-iodo-3-chloro-4-fluoro-5-bromothiophene, by reaction with equimolecular proportions of the cuprous salts of, successively, benzenethiol, 1-naphthalenethiol, 2,4,6-trimethylbenzenethiol, and 2-tertiarybutylbenzenethiol, there is obtained a dark, difficultly soluble 2-phenylthio-5-(1-naphthyl)thio - 3 - (2,4,6-trimethylphenyl)thio-4 - (2 - tertiarybutylphenyl)thio thiophene product. The compound improves the high pressure lubricity of lubricating oils to which it is added.

The halogenated thiophenes to be employed as starting materials are of known types. Many of them are listed in Beilstein's Handbuch der Organischen Chemie, 1910 edition, Band XVII, pages 29–36, and the references cited therein. They are in general made by direct halogenation, with regard for the known preferential order of halogenated sites of the unhalogenated or partly halogenated thiophene structure.

The cuprous salt of an aromatic thiol is easily prepared from the corresponding thiol by reaction with a copper source which may be metallic copper, or a copper oxide or hydroxide or halide. The thiol and copper sources are combined in the presence of at least a minor catalytic amount of nitrogenous base, and, optionally, an inert liquid reaction medium. Advantageously, the resulting reaction mixture is heated to hasten the reaction. When employing a liquid nitrogen base material such as collidine, lutidine, picoline, and the like, adequate quantities of such material may constitute liquid reaction medium.

Because the reaction of the cuprous aromatic thiolate liberates copper in a form in which it readily combines with further thiol, only small catalytic amounts of copper need be employed and they may be employed to prepare the needed cuprous aromatic thiolate in situ.

I claim:
1. 2,5-bis(1-naphthylthio)thiophene.
2. 2,5-diphenylthio-3,4-p-tolylthio thiophene.

References Cited by the Examiner
UNITED STATES PATENTS
2,870,163   1/1959   Davis et al. _____ 260—329

OTHER REFERENCES
Murphy et al.: J. Sci. Ind. Research, vol. 20B, pp. 169–76 (1961).

WALTER A. MODANCE, *Primary Examiner.*
JOHN D. RANDOLPH, *Examiner.*